United States Patent
Schindler

(10) Patent No.: US 8,446,136 B2
(45) Date of Patent: May 21, 2013

(54) PSEUDO FIXED FREQUENCY SWITCH-MODE DC/DC VOLTAGE REGULATOR CONTROL METHOD

(75) Inventor: Matt Schindler, Redwood City, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 156 days.

(21) Appl. No.: 11/735,321

(22) Filed: Apr. 13, 2007

(65) Prior Publication Data

US 2008/0252274 A1    Oct. 16, 2008

(51) Int. Cl.
*G05F 1/00* (2006.01)
*G05F 1/613* (2006.01)
*G05F 3/16* (2006.01)

(52) U.S. Cl.
USPC .......................... 323/282; 323/285; 323/223

(58) Field of Classification Search
USPC .................. 323/223, 271, 282–290
See application file for complete search history.

(56) References Cited

U.S. PATENT DOCUMENTS

| | | | |
|---|---|---|---|
| 5,747,976 A * | 5/1998 | Wong et al. | 323/282 |
| 6,400,232 B1 * | 6/2002 | Good et al. | 323/288 |
| 6,476,589 B2 * | 11/2002 | Umminger et al. | 323/282 |
| 6,747,441 B2 * | 6/2004 | Johnson et al. | 323/282 |
| 6,853,174 B1 * | 2/2005 | Inn | 323/285 |
| 7,116,562 B2 * | 10/2006 | Takashima et al. | 323/284 |
| 2005/0001602 A1 * | 1/2005 | Umminger et al. | 323/282 |
| 2006/0208715 A1 * | 9/2006 | Saeki et al. | 323/282 |
| 2007/0080674 A1 * | 4/2007 | Gray et al. | 323/282 |
| 2007/0085520 A1 * | 4/2007 | Ho | 323/282 |

FOREIGN PATENT DOCUMENTS

JP    2000116122 A *    4/2000

* cited by examiner

*Primary Examiner* — Jue Zhang

(57) ABSTRACT

A method for controlling a step down regulator includes (a) generating a first feedback signal as a function of the voltage at the output node; (b) generating a second feedback signal as a function of the voltage at the input node; (c) maintaining the on-time of the low-side switch at a fixed duration; and (d) varying the on-time of the high-side switch to be proportional to the first feedback signal and inversely proportional to the second feedback signal so that the switching frequency of the high and low side switches is approximately constant.

21 Claims, 4 Drawing Sheets

PSEUDO FIXED FREQUENCY SWITCH-MODE DC/DC VOLTAGE REGULATOR CONTROL METHOD

BACKGROUND OF THE INVENTION

Switching regulators are intended to be efficient machines for converting an input voltage to an output voltage. The two most common types of switching regulators are Boost (voltage increasing converters) and Buck (voltage decreasing regulators). Both Boost and Buck regulators are very important for battery powered applications such as cellphones. As shown in FIG. 1A, a traditional implementation for a Buck regulator includes a switch M1 connected between an input voltage ($V_{BATT}$ in this case) and a node $V_X$. A diode D is connected between the node $V_X$ and ground. An inductor L is connected between $V_X$ and the output node ($V_{OUT}$) of the regulator. A filtering capacitor connects $V_{OUT}$ to ground. The node $V_{OUT}$ is also connected to a load (not shown).

A control circuit turns switch M1 on and off in a repeating pattern. This causes the Buck regulator to have two distinct operational phases. In the first phase, shown in FIG. 1B, the switch M1 is on. During this phase, called the charging phase, the inductor is connected between the battery and the output node $V_{OUT}$. This causes current to flow from the battery to the load. In the process energy is stored in the inductor L in the form of a magnetic field.

In the second, or discharge phase the switch M1 is opened (see FIG. 1C). In this phase the diode and inductor are connected in series between ground and the load. In this phase, current supplied by the inductor's magnetic field flows to the output node $V_{OUT}$ and the load. As the inductor's magnetic field collapses and the voltage over the inductor falls, the diode prevents current flowing through the inductor from reversing direction and flowing from the load to ground.

In general, switching regulators work in environments where both the input and output voltage are dynamic voltages. Input voltages change as battery voltages decline over time or as other components draw more power. Output voltages change depending on load requirements. Switching regulators react to changes in input and output voltages by varying the amount of time that the switch M1 remains on. This is done using two different methods. In the first method, the switching frequency is varied—as the load on the regulator increases (relative to its supply) the switching frequency is increased. This is known as pulse frequency modulation or PFM. In the second method a fixed switching frequency is used and the amount of time that the switch M1 is turned on is varied. For larger loads, the switches stay on longer. This is known as pulse width modulation of PWM. Of the two methods, PWM is often preferred because it produces noise at a known and therefore filterable fixed frequency. Filtering the noise created by a PFM regulator can be problematic—especially in portable applications.

The regulator architecture just illustrated suffers one fundamental flaw: the diode D has, by nature a forward voltage drop. Depending on the type of diode, this can be fairly small, but is still generally unacceptable for low voltage applications. For this reason, it is common to replace the diode D with a second switch M2. FIG. 2 shows a Buck regulator of this type.

The basic idea is that the switch M2 operates with no voltage drop (when switched on) overcoming the disadvantages inherent in diode based designs. Regulators of this type are often referred to as "synchronous regulators" because the two switches are driven synchronously—when one is on, the other is off. In the real world, this is never quite the case. It takes time to turn the switches on and off and control cannot be done with absolute precision. For this reason, the act of turning a switch off is always done slightly in advance of the act of turning the other switch on. This technique, known as break-before-make or BBM avoids the situation where both switches are on at the same time and power is connected to ground (a condition known as shoot through).

Switching regulators fall into two categories; voltage-mode and current-mode. Generally, voltage-mode regulators are easy to implement, but with the requirement of more complex control-loop compensation. Current-mode regulators are typically more difficult to implement, but have simplified control loop compensation.

SUMMARY OF THE INVENTION

DETAILED DESCRIPTION OF THE PREFERRED EMBODIMENTS

Figure 1A:
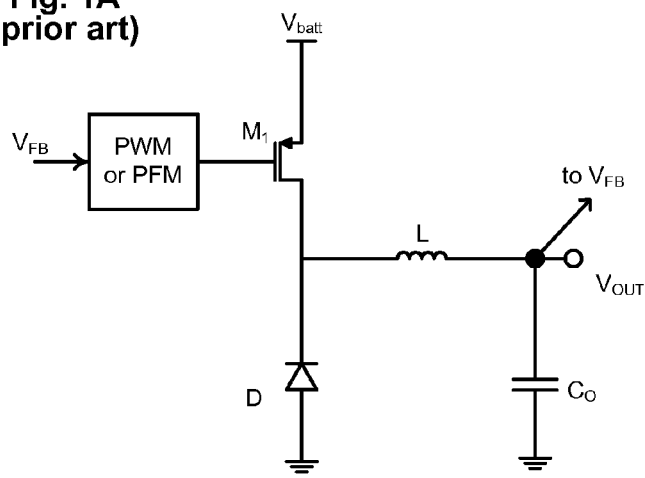
FIG. 1A is a block diagram of a prior art buck switching regulator.
Figure 1B:
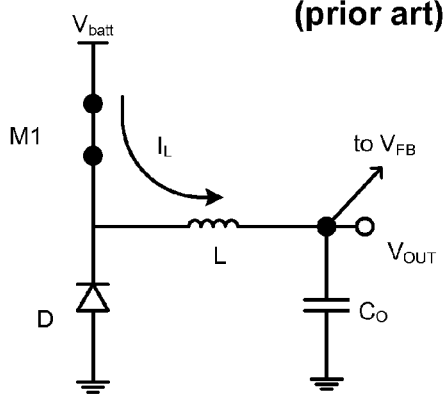
FIG. 1B is a block diagram showing the prior art buck switching regulator of FIG. 1 during the charge phase of operation.
Figure 1C:
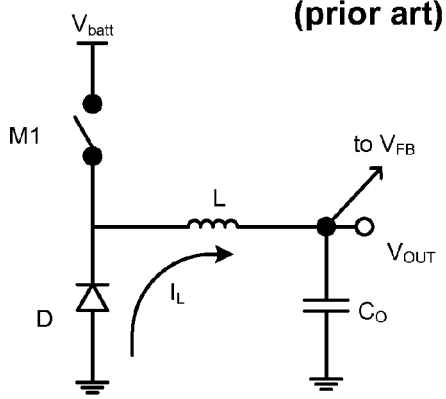
FIG. 1C is a block diagram showing the prior art buck switching regulator of FIG. 1 during the discharge phase of operation.

The disclosed invention includes a current-mode pseudo fixed frequency control method for step-down switching regulators. The control method is generally applicable to the type of switching regulator shown in FIG. 1A and described previously. When operating in steady state with continuous inductor current, regulators of this type exhibit the following property:

$$D = \frac{t_{ON}}{T_{SW}} = t_{ON} * f_{SW} \approx \frac{V_{OUT}}{V_{IN}}$$

Where:
D is the duty cycle,
$t_{ON}$ is the high-side switch on-time,
$T_{SW}$ is the switching period,
$f_{SW}$ is the switching frequency,
$V_{OUT}$ is the output voltage, and
$V_{IN}$ is the input voltage.

One result of this property is that controlling $t_{ON}$ to be proportional to $V_{OUT}$ and inversely proportional to $V_{IN}$ causes $f_{SW}$ to be approximately constant. The disclosed control method takes advantage of this result to produce an approximately constant switching frequency whenever the inductor current is continuous. When the load current decreases sufficiently, the inductor current becomes discontinuous, causing the switching frequency to decrease. This is desired, since efficiency at light load is improved by lower switching frequency.

Figure 3A:
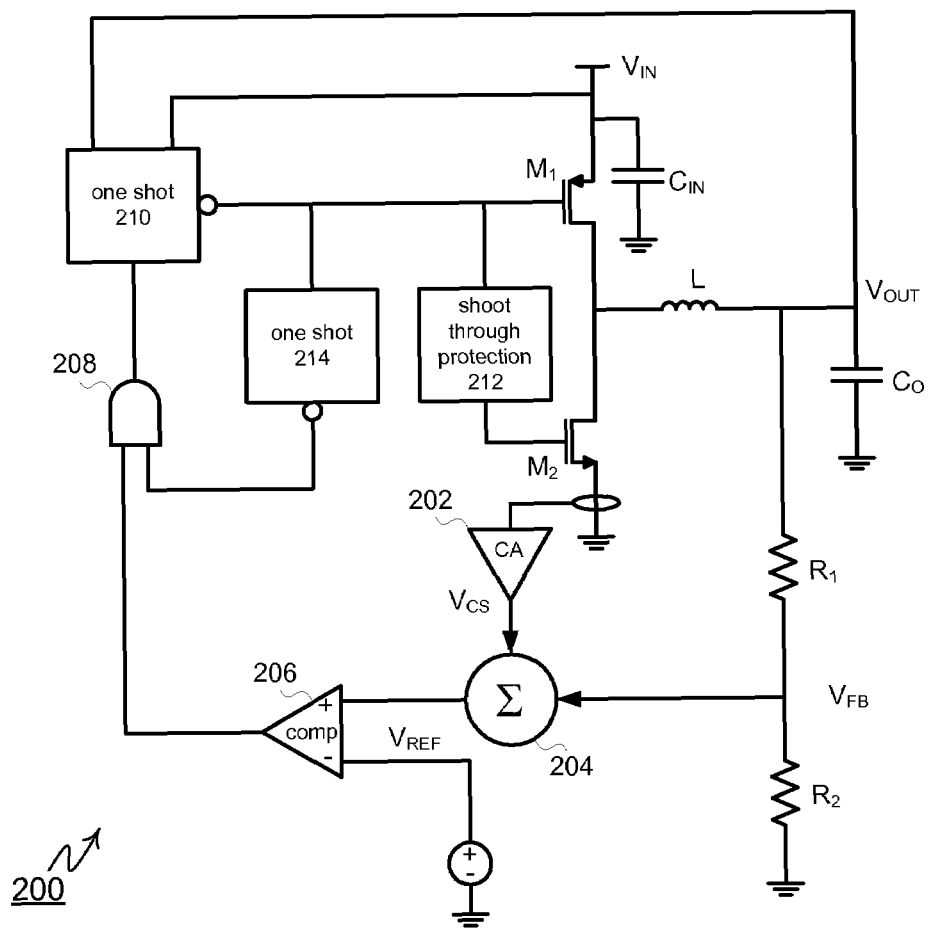
FIG. 3A is a block diagram of a buck type switching regulator as provided by the present invention.

FIG. 3A shows a step-down regulator 300 implemented to use the pseudo fixed frequency control method. Regulator 300 uses a resistive voltage divider ($R_1$ and $R_2$) to generate a feedback voltage ($V_{FB}$) that is less than and proportional to the output voltage ($V_{OUT}$). A transresistance or current sense amplifier 302 is used to measure the current passing through low side MOSFET M2 and inductor L when MOSFET M2 is switched on. Current sense amplifier 302 produces an output voltage referred to as the current sense voltage ($V_{CS}$). The feedback voltage ($V_{FB}$) and the current sense voltage ($V_{CS}$) are summed together using a summer 304 and applied to the input of a first voltage comparator 306. A reference voltage is applied to the other input of first comparator 304. In many cases, it may be desirable to implement summer 304 and comparator 306 as a single device.

The output of first comparator 304 is applied to one input of an AND gate 308. The output of AND gate 308 is connected to trigger an on-time one-shot 310. On-time one-shot 310 is also connected to receive as feedback the output voltage $V_{OUT}$ and input voltage $V_{IN}$ of regulator 300. The output of on-time one-shot 310 is connected to high-side switch M1 and shoot-through protection circuit 312. Shoot-through protection circuit 312 is connected, in turn to low-side switch M2. The output of on-time one-shot 310 is also connected to the input of an off-time one-shot 314. The output of off-time one-shot 314 provides the second input to AND gate 308.

During operation, first comparator 306 monitors the difference between the 1) sum of the feedback voltage $V_{FB}$ and the current sense voltage $V_{CS}$ and 2) the reference voltage. When the sum of the feedback voltage $V_{FB}$ and the current sense voltage $V_{CS}$ drops below the reference voltage, the output of first comparator 306 changes state and triggers on-time one-shot 310. The output of on-time one-shot 310 causes high-side switch M1 to turn on for a period of time equal to the period of on-time one-shot 306. That period is set by circuitry within on-time one-shot 31 0 to be proportional to $V_{OUT}$ and inversely proportional to $V_{IN}$. At the end of that time period, the output of on-time one-shot 310 changes states causing high-side switch M1 to turn off and low-side switch M2 to turn on. Shoot-through protection circuit 312 ensures that there is a delay between the turning off of high-side switch M1 and the turning on of low-side switch M2 preventing the input voltage from being coupled to ground through the two switches.

The change in state of on-time one shot 310 triggers off-time one-shot 314. The active-low output of off-time one-shot 314 ensures that the output of AND gate 308 is held low. This ensures that the output of first comparator 306 is prevented from triggering on-time one-shot 310 for at least the period of off-time one-shot 314. For this reason, each switching cycle of regulator 300 includes a minimum off time (where switch M1 is off and switch M2 is on) equal to the period of off-time one-shot 314. It should be noted, however that the off-time may exceed this minimum since the next switching cycle does not occur until comparator 306 detects that the sum of the feedback voltage $V_{FB}$ and the current sense voltage $V_{CS}$ has once again dropped below the reference voltage.

As stated above, the presented control method switches at an approximately constant frequency only in steady-state. When regulator 300 encounters a load current transient at the output, the switching frequency changes to quickly adjust the current through the inductor and the voltage across the capacitor improving transient response. After the inductor current and capacitor voltage have changed to their new steady-state values, regulator 300 returns to approximately the same constant switching frequency. Because the frequency is allowed to change slightly, the presented control method does not require slope compensation as is normally required for current-mode regulators, easing the implementation of such a DC to DC converter regulator.

Figure 2:
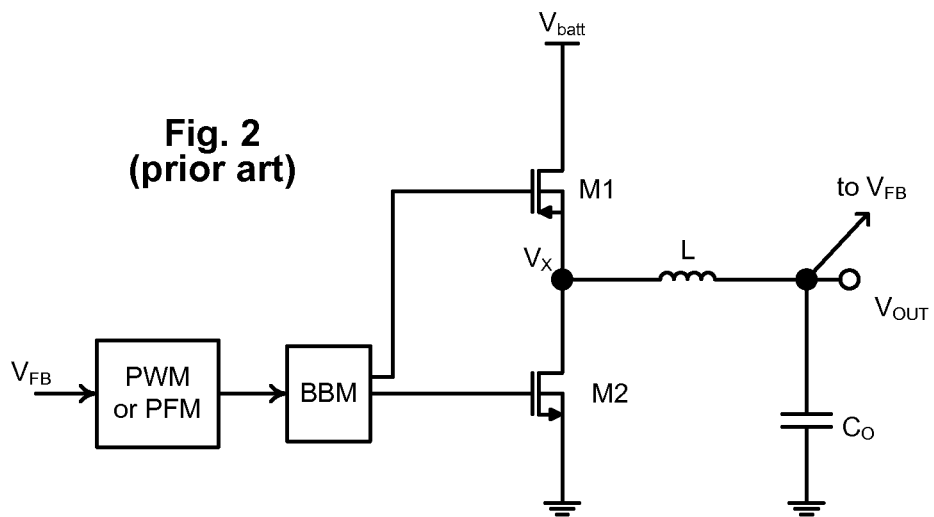
FIG. 2 is a block diagram of a prior art buck switching regulator that includes a low-side switch.
Figure 3B:
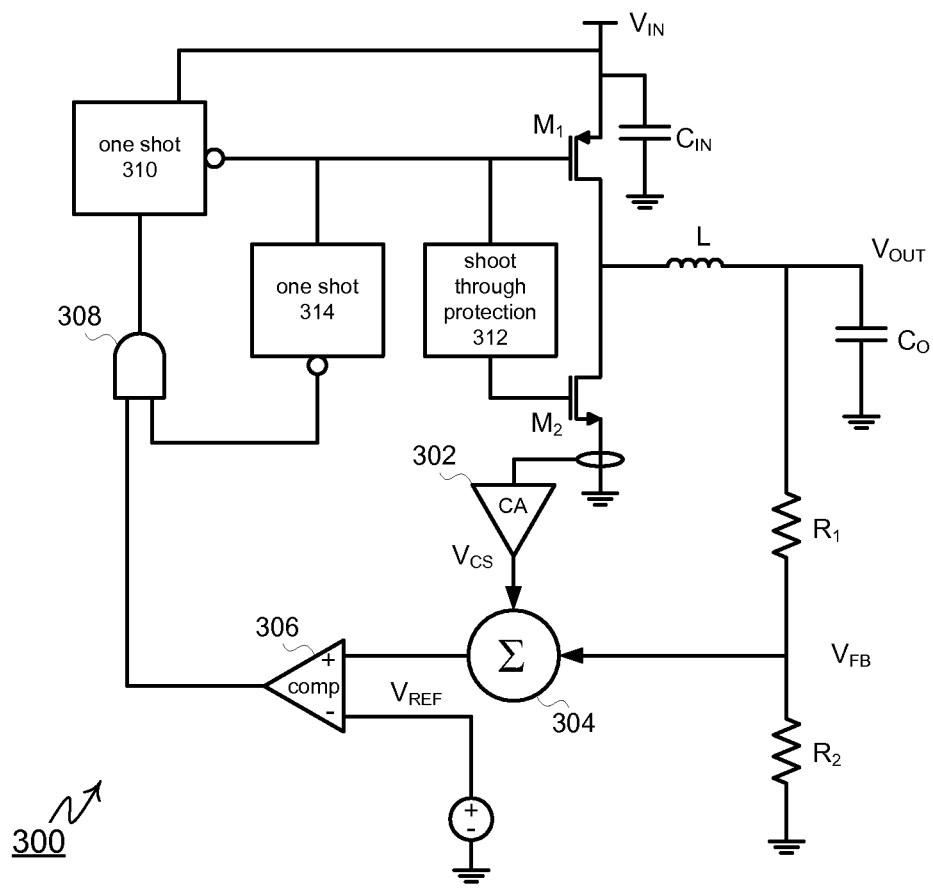
FIG. 3B is a block diagram of a buck type switching regulator as provided by the present invention.

FIG. 3B shows an alternate implementation of step-down regulator 300 that is configured so that the feedback to one-shot 310 comes from $V_{IN}$ only. This differs from the previously described implementation where the one-shot 310 receives feedback from both $V_{IN}$ and $V_{OUT}$. This change somewhat simplifies the implementation of step-down regulator 300. At the same time, the modification shown in FIG. 2C has the result that the switching frequency of step-down regulator 300 would change whenever the output voltage $V_{OUT}$ is not regulating (e.g., start-up or overload conditions).

What is claimed is:

1. A method for controlling a step down regulator including a high-side switch having a switching frequency and a low-side switch having a switching frequency the method comprising:
    generating a first feedback signal as a function of an output voltage $V_{OUT}$ at an output node $N_{OUT}$ of the step down regulator;
    generating a second feedback signal as a function of an input voltage $V_{IN}$ at an input node $N_{IN}$ of the step down regulator;
    maintaining an on-time of the low-side switch at a fixed duration; and
    varying an on-time of the high-side switch to be proportional to the first feedback signal and inversely proportional to the second feedback signal so that the switching frequency of the high-side and low-side switches is approximately constant.

2. The method of claim 1 further comprising:
    generating a voltage $V_{cs}$ as a function of current flowing between the low-side switch and ground;
    generating a voltage $V_{FB}$ as a function of voltage at the output node; and
    summing the voltage $V_{CS}$ and the voltage $V_{FB}$.

3. The method of claim 2 further comprising turning the high-side switch on when the summed voltages $V_{CS}$ and $V_{FB}$ exceed a reference voltage.

4. The method of claim 3 wherein the high-side switch is connected between the input node $N_{IN}$ and a node $N_X$.

5. The method of claim 4 wherein the low-side switch is connected between the node $N_X$ and ground.

6. The method of claim 5 wherein an inductor is connected in series between the node $N_X$ and the output node $N_{OUT}$.

7. The method of claim 6 wherein the step down regulator further includes a control circuit configured to switch the high-side and low-side switches out of phase to alternately charge and discharge the inductor to provide current to the node $N_{OUT}$.

8. A method for controlling a switching regulator including a low-side switch and a high-side switch comprising:
    generating a first feedback signal as a function of a voltage at an output node $N_{OUT}$ of the switching regulator;
    generating a second feedback signal as a function of current flowing between the low-side switch and ground;
    turning the high-side switch on as a function of the second feedback signal;
    maintaining an on-time of the low-side switch at a fixed duration; and
    varying an on-time of the high-side switch to be proportional to the first feedback signal;
    maintaining the switching frequency of the high and low side switches approximately constant.

9. The method of claim 8 further comprising:
generating a voltage $V_{CS}$ as a function of the current flowing between the low-side switch and ground;
generating a voltage $V_{FB}$ as a function of the voltage at the output node; and
summing the voltage $V_{CS}$ and the voltage $V_{FB}$.

10. The method of claim 9 wherein the high-side switch is turned on when the summed voltages $V_{CS}$ and $V_{FB}$ exceed a reference voltage.

11. The method of claim 10 wherein the high-side switch is connected between an input node $N_{IN}$ and a node $N_X$.

12. The method of claim 11 wherein the low-side switch is connected between the node $N_X$ and ground.

13. The method of claim 12 wherein an inductor is connected in series between the node $N_X$ and the output node $N_{OUT}$.

14. The method of claim 13 wherein the switching regulator further includes a control circuit configured to switch the high-side and low-side switches out of phase to alternately charge and discharge the inductor to provide current to the node $N_{OUT}$.

15. A control circuit for a step down regulator including a high-side switch and a low-side switch the control circuit comprising:
a first feedback circuit for generating a first feedback signal as a function of a voltage at an output node of the step down regulator;
a second feedback circuit for generating a second feedback signal as a function of a voltage at an input node of the step down regulator;
a first timing circuit configured to maintain an on-time of the high-side switch to be proportional to the first feedback signal and inversely proportional to the second feedback signal so that a switching frequency of each of the high-side and low-side switches is approximately constant; and
a second timing circuit configured to maintain an on-time of the low-side switch at a fixed duration.

16. The control circuit of claim 15 further comprising:
a fourth feedback circuit for generating a fourth feedback voltage as a function of current flowing between the low-side switch and ground;
a fifth feedback circuit for generating a fifth feedback voltage as a function of the voltage at the output node; and
a summer for summing the fourth and fifth feedback voltages.

17. The control circuit of claim 16 wherein the first timing circuit is configured to turn the high-side switch on when the fourth and fifth feedback voltages exceed a reference voltage.

18. The control circuit of claim 17 wherein the high-side switch is connected between the input node and a node $N_X$.

19. The control circuit of claim 18 wherein low-side switch is connected between the node $N_X$ and ground.

20. The control circuit of claim 19 further comprising an inductor connected in series between the node $N_X$ and the output node.

21. The control circuit of claim 20 further comprising a circuit assembly configured to switch the high-side and low-side switches out of phase to alternately charge and discharge the inductor to provide current to the output node.

* * * * *